United States Patent Office 3,551,853
Patented Dec. 29, 1970

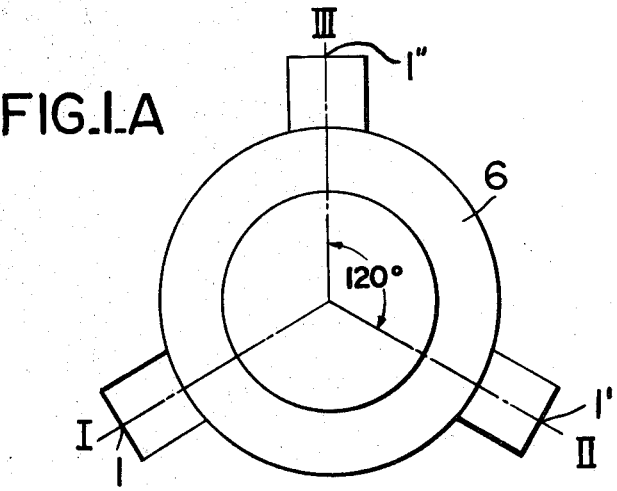
FIG.1.A
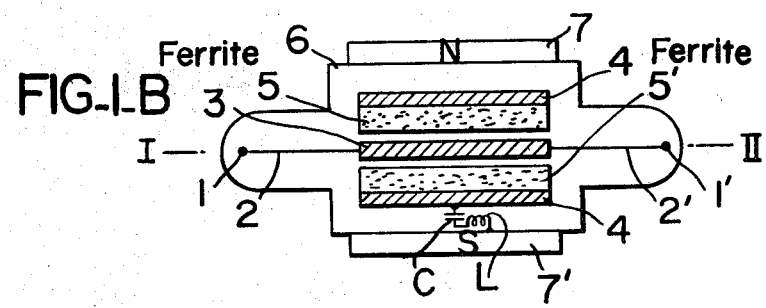
FIG.1.B
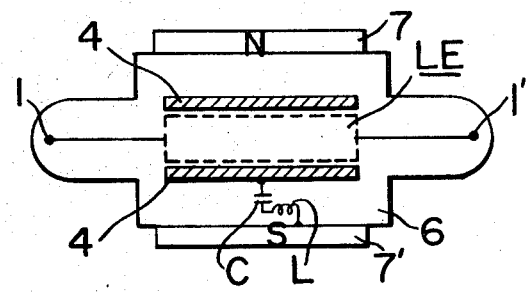
FIG.2
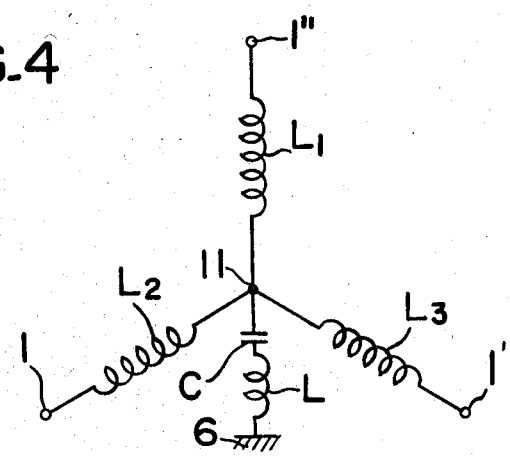
FIG.4

3,551,853
WIDE BAND CIRCULATOR COMPRISING A LUMPED ELEMENT SERIES RESONANCE CIRCUIT
Yoshihiro Konishi, Sagamihara, Japan, assignor to Nippon Hoso Kyokai, Chiyoda-ku, Tokyo, Japan
Continuation-in-part of application Ser. No. 718,890, Apr. 4, 1968. This application Dec. 18, 1969, Ser. No. 886,326
Claims priority, application Japan, Apr. 27, 1967, 42/26,555
Int. Cl. H01p 1/32, 5/12
U.S. Cl. 333—1.1                         7 Claims

ABSTRACT OF THE DISCLOSURE

A wide frequency band lumped element type Y-circulator comprising an outer case, an outer conductor plate insulated from the outer case with respect to direct current and an LC series circuit connected between the outer conductor plate and the outer case. This LC series circuit is selected to be resonant at the center frequency of the circulator so that only the same phase component of the excitation energy applied at any of the circulator terminals is fed to the series circuit. This circulator is able to widen the range of operating frequency, which had been restricted by a difference of impedance variation factors between the same phase excitation component and the positive or negative phase excitation component of the excitation energy.

CROSS REFERENCE TO RELATED APPLICATION

This application is a continuation-in-part application of applicant's copending application U.S. Ser. No. 718,890 filed on Apr. 4, 1968.

BACKGROUND OF THE INVENTION

Operational features of a circulator using ferrite may be analyzed by three kinds of mode of excitation of the excitation energy applied at the terminal ports. These three kinds of mode of excitation are same phase excitation, positive phase excitation and negative phase excitation respectively.

The conventional circulators are considered to be difficult for realizing wide frequency band characteristics by the operational principle, owing to the fact that each of the variation factors of the impedances for the case of the same phase exciting component, positive phase exciting component and negative phase exciting component is different from each other, so that it is difficult to maintain a constant angle relation for each component on a Smith Chart when the center frequency of the exciting energy for the circulator is varied.

In order to solve such defect in widening the applicable frequency band in such kinds of circulators, it has been suggested to provide an impedance compensating circuit for each of the terminal ports for the same phase excitation of exciting energy. In the known devices such impedance compensating circuits are provided outside of the circulator or may be housed in an outer case of the circulator.

Such conventional circulator using compensating circuits for each of the terminal ports has a disadvantage in that a satisfactory wide band character is still unobtainable for the reason that there exists not only a same phase excitation component but, also, positive and negative phase excitation components at each of the circulator terminal ports. Therefore the effect of the compensating circuits is not limited to the same phase excitation component but, it also causes an influence on the positive and the negative phase excitation components.

This known circulator has still further disadvantages in that miniaturization is difficult owing to the fact that the compensating circuit must be provided for each of the terminal ports. Moreover, the adjustment of the compensating circuits to have identical characteristics is also not easy.

As a solution for the above problems, the applicant filed application Ser. No. 718,890 on Apr. 4, 1968, in which he disclosed a wide frequency band circulator housing a cavity resonator.

The present invention relates to a wide band circulator based on nearly the same principle as that of the above mentioned application Ser. No. 718,890, but the present invention is intended to realize a wide band circulator having a more miniaturized construction composed of very simple components by eliminating the use of the cavity resonator.

SUMMARY OF THE INVENTION

The present invention relates to a Y-type circulator having ferrite loaded between the coupling point of the inner conductors led from each of the terminal ports and an outer conductor, more particularly, to a wide band circulator having a ground conductor beside the inner and the outer conductors, and a series resonance circuit connected between the outer conductor and the ground conductor, which is tuned to the center frequency of the circulator.

The present invention has for its object to provide a novel circulator which is able to widen its operational frequency band without adding compensating circuits for each of the circulator terminals.

A further object of the present invention is to realize a novel circulator having an operational feature of wide operating frequency range and a constructive feature of providing a miniaturized and light weight device by applying the inventive idea to a lumped element type circulator.

In order to realize above objects, in accordance with the present invention, a circulator having a plurality of coaxial feeding terminals arranged at rotationally symmetrical positions and a loading ferrite layer or layers inserted between a coupling portion of the inner conductors led from the inner conductors of the terminals and an outer conductor, wherein a D-C magnetic field is applied to the ferrite layer or layers, is further provided with a ground conductor while keeping the outer conductor isolated from the ground conductor with respect to direct current and a series resonance circuit resonating with the center frequency of the circulator between the ground conductor and the outer conductor.

By this construction the same phase excitation component at each of the terminal ports are short-circuited and only the positive or negative phase component is effective for the operation of the circulator, so that a wide band character is realized.

By making the ground conductor in the form of an outer case of the inventive circulator, the circulator may easily be miniaturized. The present invention is particularly suitable to apply for a lumped element Y-circulator, such as, for instance, disclosed in Patent No. 3,335,374 patented on Aug. 8, 1967, for raelizing a very excellent wide frequency range and miniaturized and light weight construction.

BRIEF DESCRIPTION OF THE DRAWINGS

FIG. 1–A is a front view of an embodiment of a Y-type circulator according to the present invention;

FIG. 1–B is a cross-sectional view along the line I–II of FIG. 1–A showing the inner construction of the circulator according to the present invention;

FIG. 2 is cross-sectional view of a second embodiment of the invention, which is applied with a lumped element type Y-circulator and the cross-section is taken by the same manner as that of FIG. 1–B;

FIG. 4 is a circuit diagram of an embodiment of the present invention applied to a lumped element type circulator having a coil shaped inner conductor coupling portion of which the coil conductors are arranged in a star connection.

DESCRIPTION OF THE PREFERRED EMBODIMENT

Figure 3:
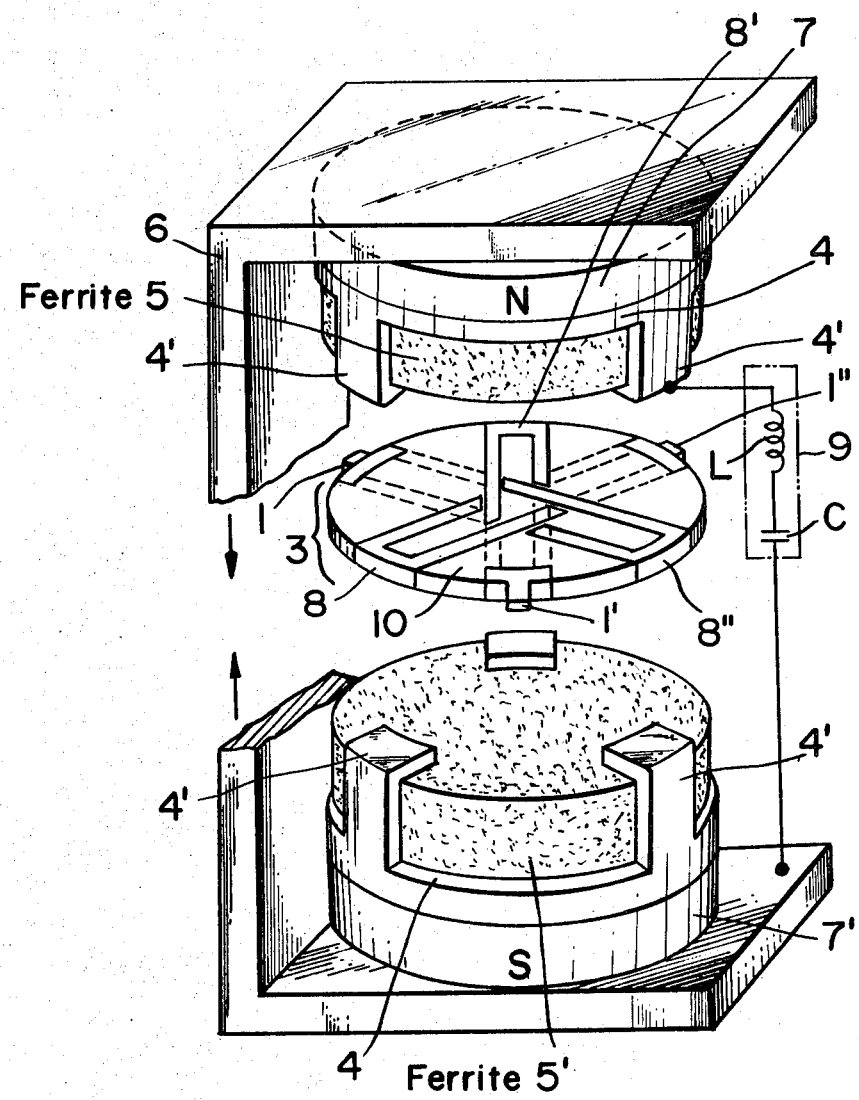
FIG. 3 is an exploded perspective view for showing a practical construction of an embodiment of the present invention applied with a lumped element type circulator having mesh shaped inner conductor coupling portion.

In FIG. 1–A and FIG. 1–B, 1, 1' and 1" are the terminal ports arranged in rotational symmetry, i.e., with a 120° separation from each other. In FIG. 1–B, 2 and 2' are the inner conductors and 4 is an outer conductor. The coupling portion 3 of the inner conductors is generally shown leading from each of the terminal ports. In FIG. 1–B, this outer conductor is shown having two parts, but these two parts of this conductor are electrically connected together to be at the same potential. Ferrite plates 5 and 5' are loaded between the outer conductor 4 and the inner conductor coupling portion 3 and 6 is a ground conductor which forms an outer case of the circulator. The magnetic poles 7 and 7' apply a D-C magnetic field to the ferrite plates. In order to simplify the drawing, a yoke portion of the magnet system is not shown.

The outer conductor 4 of the basic lumped element Y-circulator is insulated from the ground plate 6, which is connected to each of the ground conductors of each of the terminal ports 1, 1', 1". This circulator further comprises a series resonance circuit consisting of series connection of a capacitive element C and an inductive element L, which is resonant at the center frequency of the circulator. In this construction, it is preferred to connect said series resonance circuit at the center of the outer conductor 4 surrounding the top and bottom sides of the circulator lumped element including the coupling portion of inner conductors and the ferrite bodies. This connection may be made to either the top or bottom side of the outer conductor 4 or made to both the top and the bottom sides of the outer conductor 4. In case a series resonance circuit is inserted at both the upper side and lower side of the outer conductor 4 and connected at the center of the outer conductor 4, the value of the elements consisting of the series resonance circuit may be chosen as 2L and C/2, respectively. In case the size of the outer conductor 4 is extremely small, compared with wave length of the center frequency, the connection point of the series resonance circuit need not be limited to be at the center of the outer conductor 4, since in such a wave length the outer conductor 4 may be regarded as equipotential.

In this embodiment, if the three terminal ports of the circulator are excited in a positive phase or in a negative phase, the amounts of corresponding currents of the excitation are cancelled by the series resonant elements connected to the outer conductor 4. Only in cases when the ports are excited in the same phase excitation will the current flow through the series resonance circuit so that a wide band circulator can be realized.

FIG. 2 shows an embodiment, in which the present invention is applied for a lumped element type circulator.

As is well known, for instance, by Patent No. 3,335,374 or Patent No. 3,286,201, this kind of lumped element type circulator comprises mesh formed or coil shaped inner conductors. Therefore, a provision of cavity resonator for widening the operational frequency range, as proposed in the parent application Ser. No. 718,890 filed on Apr. 4, 1968 is not easy in practice.

In accordance with the present invention, this kind of lumped element type circulator can easily be improved in widening the operational frequency.

In FIG. 2, the same parts as those in FIG. 1 are designated by the same reference numerals. The center block portion designated as LE shows a coupling portion of inner conductors of a lumped element type circulator including ferrite plates, delta shaped or star shaped coupling coil of the inner conductor or a mesh shaped coupling portion of the inner conductors.

FIG. 3 is a detailed exploded perspective view showing a practical construction of a lumped element circulator improved in the operational frequency in accordance with the present invention. This figure is in exploded form in order to show the practical construction of the inventive circulator, which is based on a lumped element type circulator, for instance, disclosed by Patent No. 3,335,374.

The lumped element type circulator of the embodiment comprises inner conductor coupling portion 3, in which a plurality of conductor pieces led from each of the terminal ports 1, 1', 1" are crossed while keeping an insulation at each of the crossing points. The other ends 8, 8' and 8" of the conductors are electrically connected to the outer conductor 4 by means of projected portions 4' of the outer conductor 4.

The inner conductors may be provided by a printing technique printed on the upper and the lower sides of an insulating base 10. The ferrite plates 5 and 5' are rigidly secured by the projecting pieces 4' on the outer conductor 4. The upper and the lower piece of the ferrite plates and the outer conductor may preferably be made symmetrical. A ground plate 6 forms an outer case of the circulator. The ground conductor 6 and the outer conductor 4 are electrically insulated from each other by means of two magnetic poles N and S, for instance, made of barium ferrite. However, the insulation may be effected by an insulating adhesive. The ground conductor 6 consists not only of the container of the circulator, but also acts as a yoke of the magnetic system for the circulator.

In accordance with the present invention, a series resonance circuit 9 consisting of a series combination of a capacitive element C and an inductive element L, both of which may preferably be formed as a lumped element, is connected between the outer conductor 4 and the ground conductor 6.

Although it is not shown in the drawing, the invention may be applied with a circulator having an inner conductor coupling portion formed by a substantially star connection of the inner conductor pieces led from each of the terminal ports and wound around the ferrite plate and the end of the conductor pieces are connected to the outer conductor. Also in the circulator construction the outer conductor may be isolated from the ground conductor for D-C current and a series resonance circuit, according to the invention, may be connected between the two conductors.

FIG. 4 is a circuit diagram showing an application of the present invention for a circulator having a construction in which the inner conductor coupling portion consists of a star connection of conductor pieces led from each terminal and wound around the ferrite plates. Usually, an outer conductor is not provided for such a circulator. The invention may be applied by inserting the LC series resonance circuit between a center point of the star connection and the ground conductor.

In this figure 1, 1' and 1" are the inner conductors of the terminal ports, and $L_1$, $L_2$ and $L_3$ are the coils composed by conductor pieces led from the inner conductors of the terminals. As shown in this figure, a series resonance circuit consisting of a capacitive element C and an inductive element L is connected between the central point 11 of the star connection and the ground conductor 6 illustrated schematically.

The function and effect of the lumped element type circulator improved in accordance with the present invention are exactly the same as that of the first embodiment explained by referring to FIGS. 1-A and 1-B.

By applying the present invention to a lumped element type circulator, a great advantage in improving the operational frequency range is obtained, in addition to the very advantageous constructive feature of miniaturization and light weight construction which had already been recognized as a feature of the lumped element type circulator.

What is claimed is:

1. A wide frequency band circulator comprising a plurality of terminal ports arranged in rotationally symmetrical positions and having inner conductors led from each of the terminal ports of the circulator to a coupling portion, an outer conductor, at least one loading ferrite body having a controlling D-C magnetic field applied thereto and disposed between said coupling portion and said outer conductor, a ground conductor, said outer conductor being insulated from the ground conductor with respect to direct current and a series resonance circuit resonating with the center frequency of the circulator and consisting of lumped elements inserted between the outer conductor and the ground conductor.

2. A wide frequency band circulator as claimed in claim 1, wherein the ground conductor is arranged to form an outer case of the circulator.

3. A wide frequency band circulator as claimed in claim 2, wherein the circulator has a construction of a lumped element type circulator.

4. A wide frequency band circulator as claimed in claim 3, wherein the inner conductor coupling portion is formed by a plurality of inner conductors led from each of the terminal ports and crossing each other and the end of the inner conductors remote from the terminal ports are electrically connected to the outer conductor.

5. A wide frequency band circulator as claimed in claim 3, wherein the inner conductor coupling portion is formed by a plurality of inner conductors led from each of the terminal ports and wound around said at least one loading ferrite body and the end of the inner conductors remote from the terminal ports are connected to the outer conductor.

6. A wide frequency band circulator comprising a plurality of terminal ports arranged in rotationally symmetrical positions, at least one ferrite plate body having a controlling D-C magnetic field applied thereto, an inner conductor coupling portion formed by conductor pieces led from each of the terminal ports and arranged to wind around the ferrite plate, the end of the conductor pieces remote from each of the terminal ports being connected together to form a star connection, a ground conductor and a series resonance circuit consisting of lumped elements connected between the ground conductor and the center connecting point of the star connection.

7. A wide frequency band circulator as claimed in claim 6, wherein the ground conductor is arranged to form an outer case of the circulator.

References Cited
UNITED STATES PATENTS 3,165,711   1/1965   Drumheller et al. _____ 333—1.1
3,286,201   11/1966   Roberts, Jr. _____ 333—1.1

PAUL L. GENSLER, Primary Examiner

U.S. Cl. X.R.

333—84